Oct. 28, 1958  G. L. THOMPSON  2,858,176
BEARING MOUNTING AND SEALS THEREFOR
Filed Aug. 20, 1956  2 Sheets-Sheet 1

INVENTOR.
Glenn L. Thompson
BY
Jennings, Carter & Thompson
Attorneys

Oct. 28, 1958 G. L. THOMPSON 2,858,176
BEARING MOUNTING AND SEALS THEREFOR
Filed Aug. 20, 1956 2 Sheets-Sheet 2

INVENTOR.
Glenn L. Thompson
BY
Jennings, Carter + Thompson
Attorneys

United States Patent Office 2,858,176
Patented Oct. 28, 1958

2,858,176

BEARING MOUNTING AND SEALS THEREFOR

Glenn L. Thompson, Birmingham, Ala., assignor to Transall Incorporated, a corporation of Alabama Application August 20, 1956, Serial No. 605,045

4 Claims. (Cl. 308—187.1)

My invention relates to bearing mountings and seals which are especially adapted for use in idler rolls for conveyor belts.

An object of my invention is to provide improved means for sealing the anti-friction bearings of an idler roll against the ingress of foreign matter and the egress of lubricant, and more particularly to provide a seal for the outer end of the bearing bore which shifts axially in the bore as the outer retaining nut is screwed into place.

Another object is to provide a combined bearing retaining nut and seal assembly embodying an annular seal of resilient material carried in a groove extending around the periphery of the nut and another seal having sealing lips coacting with surfaces of inner parts of the nut, all to the end that the bearing cavity is sealed in an efficient manner.

Another object is to provide a sealed bearing idler roll in which the seal for the inner surfaces of the bearing retaining nut comprises an annular member of rubber or the like having a pair of annular sealing lips the side thereof adjacent the inner surfaces of the nut, one of said lips contacting a radially extending part of the nut and the other thereof contacting an axially extending part, whereby the latter lip remains always in contact with the nut while the nut moves inwardly into firm, compressing contact with the first named lip.

Briefly, my invention contemplates the provision of means to seal a bore in which is placed an anti-friction bearing, particularly a roller bearing. As is well known, the maintenance of bearings in machinery such as idlers for conveyor belts presents a very serious problem inasmuch as these belts are supported on the rolls under the most adverse conditions especially where the belt is carrying coal, sand, or other abrasive materials. The problem is to prevent not only the ingress of foreign matter through the outer seal into the bearing but also to prevent the egress of lubricant. My improved bearing seal comprises a nut which holds the bearing assembled and which has a wide shouldered part with a groove in the periphery thereof. In the groove is an O-ring or the like which contacts the inner surface of the bore of the hub and seals between the nut and the bore. In addition to this I provide another improved seal which cooperates with the nut and the O-ring just mentioned and which fits inside the nut, that is, between the bearing and the nut. This seal has two annular sealing lips, the larger diameter one being longer in a direction axially of the bore than the other. The longer lip fits against a radially extending inner face of the nut shoulder, whereas the shorter annular lip fits around an axially extending part of the nut. Therefore, when the nut is drawn up snug against the side of the inner race of the bearing the O-ring and the two annular lips all are in sealing position relative to their associated surfaces. The shorter lip converges toward the nut part so that when lubricant under pressure is supplied through the bearing it passes under said lip, providing a lubricant seal for the bearing. I preferably mount the double lip seal in a metal housing which fits in the bore of the hub. Also, I preferably provide a single lip seal at the inner end of the bore to retain the lubricant and assure its passage, when under pressure, through the bearing.

Apparatus illustrating features of my invention is shown in the accompanying drawing forming a part of this application in which.

Figure 1:
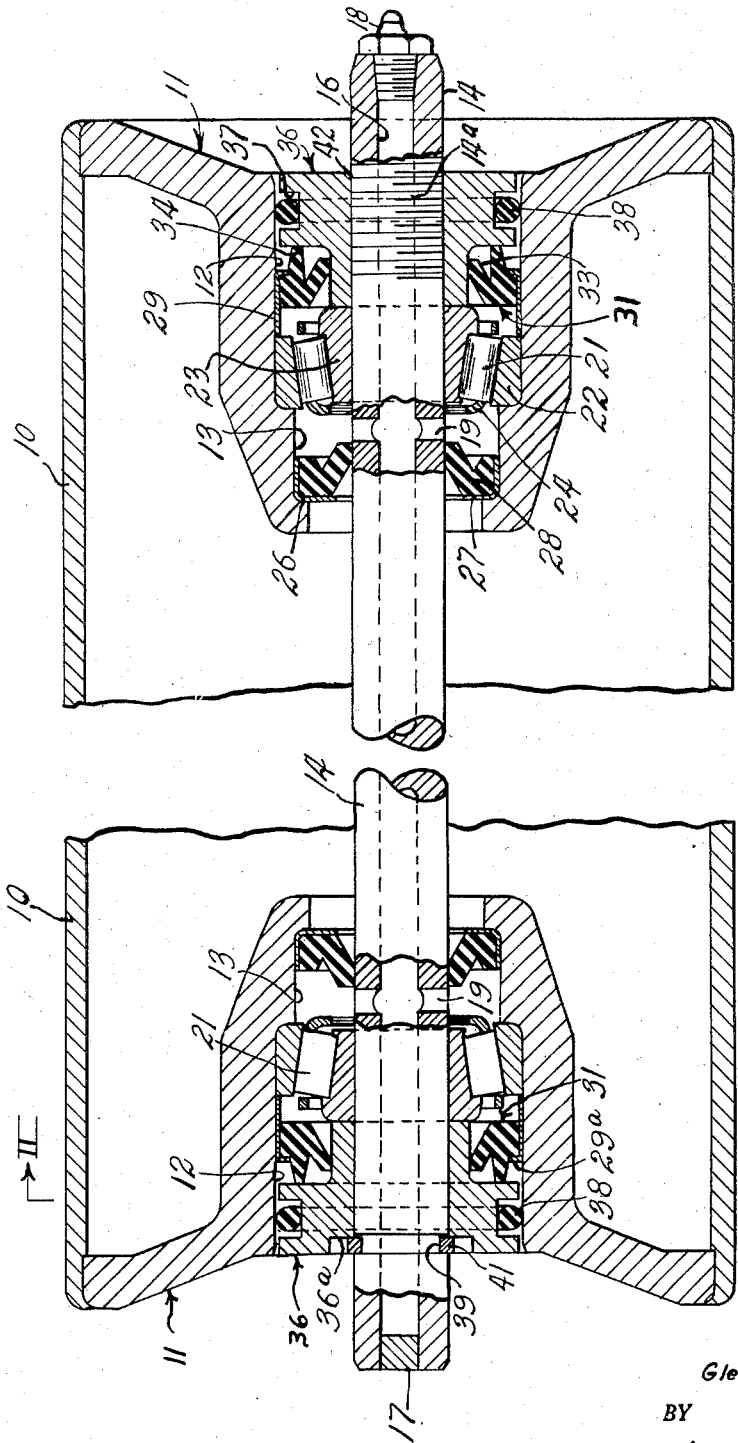
Figure 1 is a fragmental longitudinal section through an idler roll equipped with my improved bearing seals, certain of the parts being broken away and in section for the sake of clarity.
Figure 2:
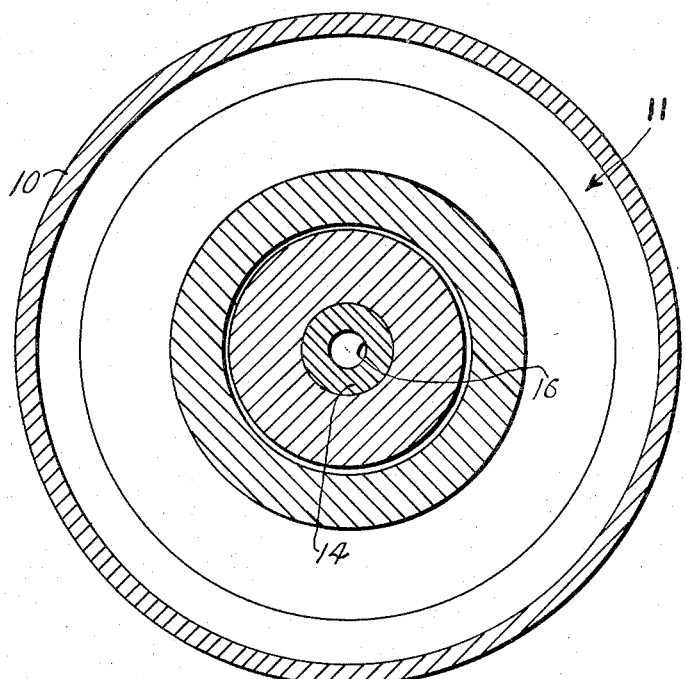
Fig. 2 is a detail sectional view taken generally along line II—II of Fig. 1.

Referring now to the drawings for a better understanding of my invention I show in Fig. 1 an idler roll which comprises the usual cylindrical shell 10 and which has therein heads indicated generally by the numerals 11. In view of the fact that the heads and their associated bearings and seals are identical a description of one will suffice for both.

The heads 11 are provided with a bore comprising a larger diameter outer portion 12 and a smaller diameter portion 13. The entire idler roll is supported by means of a stationary shaft 14, the shaft being mounted in any suitable supporting brackets not shown. The shaft 14 is provided with a through lubricant passage 16, one end of which is closed by a plug 17. A pressure type lubricant fitting 18 may be placed in one end. There are lateral lubricant passages 19 in the bore of the hub whereby lubricant is free to flow into both bearings as will be understood from an inspection of the drawing.

The anti-friction bearing illustrated comprises rollers 21 which are mounted in the manner understood between an outer race 22 and an inner race 23. The races may be press fitted respectively into the bore portion 12 and around the supporting shaft or axle 14. The bearing may be provided with the usual separator 24.

At the inner end of the portion 13 of the bore is an inturned shoulder 26. Fitting against the shoulder 26 is a retainer 27 which carries an inner seal 28 of resilient material such as rubber. It will be understood that the seal 28 and its cup turns with the head 11.

Figures 3, 4:
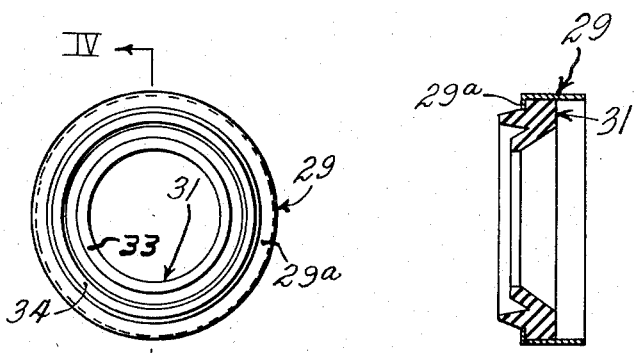
Fig. 3 is an elevational view of one of the double lip seals as viewed from the lip side thereof; and, Fig. 4 is a detail sectional view taken generally along line IV—IV of Fig. 3.

Fitting into bore portion 12 and with the inner ends thereof contacting the outer edges of the outer race 22 is a cup 29 for my improved double lip seal indicated generally by the numeral 31. As shown in Fig. 4 of the drawing the cup has a radially directed outer flange 29a. It will be understood that the seal 31 fits tightly inside its retainer cup 29.

The seal 31 has on its outer face a pair of concentric sealing lips, the innermost or small diameter one being indicated by the numeral 33 and the outer or larger diameter one being indicated by the numeral 34. It will be noted that lip 34 is longer than lip 33.

The shaft 14 is provided with a threaded section 14a on one end, for instance the end nearest the lubricant fitting 18. Adapted to be screwed on to the threaded section 14a is a nut indicated generally by the numeral 36. The nut 36 has an annular groove 37 around the periphery of its wide shouldered flange. Adapted to fit in the groove 37 is an O-ring or the like 38 made of resilient material such as rubber. The O-ring is of such a size that it fits snugly against the bottom of groove 37 and against the inner walls of the bore portion 12. The nut is provided with a reduced diameter, axially extending boss as shown.

The nut 36 at the opposite end of the roll may be provided with an undercut portion 36a. The shaft may be grooved as at 39 to receive a retainer ring 41.

From the foregoing the method of constructing and using my improved idler roll together with the advantages thereof may now be readily explained and understood. The assembly may be started by placing the inner seals 28 in their retaining cups 27 within the portion 13 of the bore of the heads 11. The bearings now are put in place to be followed next by the double lip seals 31. The nut 36 carrying the undercut portion 36a is put in place and retainer ring 41 is snapped into the annular groove 39. The nut 36 at the opposite end of the roll is run up on to the threaded portion 14a until the inner end of the nut contacts the side of the inner race 23. This positions the longer annular sealing lip portion 34 against the radial portion of the nut and also places the sealing lip 33 tightly in contact with the axially extending part of the nut. At the same time, the O-rings 38 are maintained in place with a very tight, sealing engagement. Lubricant under pressure is supplied through the fitting to the through opening 16 where it passes through the lateral openings 19 to the bearings.

It will be seen that drawing up of the nut 36 on to the threaded part 14a serves also to draw together the seal and bearing assemblies in both of the heads 11. That is, since the retaining ring 41 fits in a groove in the shaft 14 and bears against adjacent nut 36, slight axial movement of the shaft to the right as viewed in Fig. 1, in response to running in on the nut 36 on the threaded portion 14a, serves to draw tight all the parts and to place them in their correct positions. When this has been done nut 36 on the threaded section 14a may be center punched slightly as at 42, thereby to lock that nut in place.

From the foregoing it will be apparent that I have devised an improved bearing mounting and idler roll containing the same. My invention is particularly useful for those installations of conveyor belts in which heavy loads of abrasive, cutting materials are being transported. The combination of the O-rings 38 and the double lip seals 31 is very effective in eliminating the entrance of foreign matter into the bearing and in maintaining lubricant therein. It will be noted that the innermost lip 33 of the seal 31 slopes away from the direction in which the lubricant under pressure is supplied. Grease therefore is forced under pressure through the bearing and in fact raises the lips 33 whereby, the space between the two lips is filled with lubricant. Also, and if enough lubricant is supplied under sufficient pressure it will be found that grease exudes past the lip 34 and into the groove 37. This affords a considerable amount of protection to the bearing, enabling it to be flushed out with fresh lubricant when desired.

While I have shown my invention in but one form, it will be obvious to those skilled in the art that it is not so limited, but is susceptible of various changes and modifications without departing from the spirit thereof, and my desire, therefore, that only such limitations shall be placed thereupon as are specifically set forth in the appended claims.

What I claim is:

1. A seal and bearing retaining nut assembly for a hub wherein the hub has a bore with an anti-friction bearing therein and an axle passing through the bore, means to hold the bearing in the hub and to seal the outer end of the bore comprising a nut threaded onto the axle and having an axially and inwardly extending reduced diameter boss adapted to hold the bearing against axial movement in the bore, a seal in the bore having radially spaced annular sealing lips of resilient material contacting the exterior surface of the nut with one annular sealing lip contacting the boss with a running fit, there being an annular groove on the periphery of the nut, and an O-ring of resilient material in the annular groove of a size to seal between the nut and the bore wall.

2. A seal and bearing retaining nut assembly for the bore of a hub wherein the hub has a bearing therein and an axle passing centrally therethrough, a nut having a wide shouldered part of a diameter to fit snugly in the bore, there being an annular groove in the periphery of the wide shouldered part, an O-ring of resilient material in the groove and of a size to seal between the nut and the wall of the hub bore, an inwardly extending reduced diameter boss on the nut, a seal fitting tightly in the hub bore and over the reduced diameter part of the nut, and annular sealing lips of resilient material on the seal, one of which contacts the boss of the nut with a running fit and the other of which contacts the inner side of the wide shouldered part of the nut.

3. The combination set forth in claim 2 in which the sealing lip contacting the reduced diameter part of the nut is shorter in an axial direction than the sealing lip which contacts the wide shouldered part of the nut.

4. A seal and bearing retaining nut assembly for a hub having an anti-friction bearing therein and a supporting shaft passing centrally through the hub, a retaining nut adjacent the outer end of the bore threaded onto the shaft, said nut embodying a wide shouldered outer portion and an inwardly extending reduced diameter portion contacting the outer side of the bearing, there being an annular peripheral groove in the face of the wide shouldered part of the nut, a seal of resilient material in said groove sealing between the nut and the inner walls of the bore, a seal of resilient material in the bore surrounding the reduced diameter portion of the nut and having a sealing lip thereon contacting said reduced diameter part, said sealing lip sloping downwardly and outwardly as viewed from the inner side of the seal, another annular sealing lip on said seal contacting the inner face of the wide shouldered part of the nut, said last mentioned lip being longer in an axial direction than the first mentioned one and contacting the surface of the nut substantially at right angles, and lubricant retaining seal means adjacent the inner end of the bore.

References Cited in the file of this patent

UNITED STATES PATENTS

| | | |
|---|---|---|
| 1,655,335 | Pfleegor | Jan. 3, 1928 |
| 2,498,013 | Smith | Feb. 21, 1950 |